2,805,263

HALOGENATION OF PHENOLS WITH CUPRIC HALIDES

Warren W. Kaeding and Robert O. Lindblom, Concord, Calif., assignors to The Dow Chemical Company, Midland, Mich., a corporation of Delaware No Drawing. Application September 23, 1955, Serial No. 536,310

6 Claims. (Cl. 260—623)

This invention relates to a method of halogenating phenol and the alkyl phenols having replaceable hydrogen atoms in at least one of the ortho- and para-positions on the benzene ring. It relates in particular to a method for introducing chlorine or bromine into such phenols by reaction with cupric chloride or bromide as the halogenating agent.

According to the present invention, phenol or an alkyl phenol having a replaceable hydrogen atoms in at least one of the 2,4 or 6 positions on the benzene ring is heated in liquid contact with cupric chloride or bromide at a temperature of at least 45° C. but which need not exceed 300° C., to effect reduction of at least part of the cupric halide to the cuprous state and conversion of the phenol proportionally to a halophenol. The reaction may be effected by liquid contact between the molten phenol and the cupric halide, or it may be carried out in an aqueous medium. The reaction is more rapid at elevated temperatures in the recited range than at the lower temperatures, but the only requirement is that the temperature be one at which the cupric halide is reduced by the phenol to cuprous halide as may be noted by the characteristic color change from the typical cupric blue-green to the cuprous grey or white. At temperatures above the atmospheric boiling point of the most volatile matter present, the necessary liquid contact between the phenol and the cupric halide is maintained by carrying out the reaction in a closed vessel under the autogenous pressure.

The maximum amount of halogenation which can occur is limited by the molecular ratio of the phenol to the cupric halide originally present. For each atom of halogen entering into a halophenol, two mols of cupric halide are required, as is illustrated by the equation $$C_6H_5OH + 2CuCl_2 \rightarrow ClC_6H_4OH + HCl + Cu_2Cl_2$$

Anhydrous reaction favors para-halogenation, and the ratio of ortho- to para-halogenation increases when water is present, proportional to the amount of water.

The following examples illustrate the practice of the invention:

*Example 1*

There was charged into a glass lined pressure vessel ninety grams (0.96 mol) of phenol, 130 grams (0.97 mol) of cupric chloride and 200 ml. of water. The mixture was heated thirty minutes at 275° C. The mixture was filtered, to separate the aqueous and organic liquid phases from grey cuprous chloride and tar. The organic matter in the filtrate consisted of about 20 percent orthochlorophenol, 20 percent parachlorophenol, and 60 percent unchanged phenol.

*Example 2*

Phenol in the amount of 104 grams (1.1 mols) was heated to the reflux temperature of 180° C. with 123 grams (0.92 mol) of anhydrous cupric chloride, with stirring, for fifteen minutes. The mixture was cooled, diluted with methylene chloride to extract phenolic matter from the cuprous chloride, and was filtered. After distilling the solvent from the filtrate there remained 108 grams of organic matter. This was distilled and consisted of about 5 grams (0.039 mol) orthochlorophenol, about 50 grams (0.39 mol) parachlorophenol, and about 49 grams (0.52 mol) of phenol. The approximately 0.43 mol of chlorinated phenol represents over 93 percent utilization of the cupric chloride as a chlorinating agent.

*Example 3*

A mixture of 49 grams (0.52 mol) of phenol and 116 grams (0.52 mol) of cupric bromide was heated on a steam bath. There was evidence of reaction when the temperature reached 45° C., as the mixture began to change color and to evolve hydrogen bromide and to precipitate cuprous bromide. Heating was continued for 2 hours. The mixture was filtered and the solid cuprous bromide was washed with ether. The organic matter, freed from ether, weighed over 59 grams and consisted of about 12 grams (.07 mol) orthobromophenol, about 20 grams (0.115 mol) parabromophenol, about 27.4 grams (0.29 mol) of phenol, and a trace of dibromophenol. The estimated bromination efficiency was about 72 percent, based on the amount of cupric bromide in the original charge.

*Example 4*

A mixture of 37 grams (0.394 mol) of phenol, 88 grams (0.394 mol) of cupric bromide, and 100 ml. of water was heated for 2 hours at about 80° C. The organic matter was recovered from the cuprous bromide and weighed 45.7 grams. This consisted of the following compounds in the approximate ratios shown:

| Compound | Grams | Mols |
| --- | --- | --- |
| Orthobromophenol | 3 | 0.017 |
| Parabromophenol | 18 | 0.104 |
| 2,4-Dibromophenol | 1 | 0.004 |
| Phenol | 23.7 | 0.252 |
| | 45.7 | .377 |

The brominated phenols, representing about 0.129 atoms of bromine, indicate that about 65 percent of the possible bromination had occurred in the course of the reaction. Higher temperatures or longer reaction times favor more complete reaction.

In the foregoing examples, it is noted that approximately equimolar amounts of the phenol and of the cupric halide were employed. This was intended to leave an excess of phenol so as to minimize polyhalogenation, but it has been found that the amount of cupric halide can be increased safely to the stoichiometric ratio without excessive dihalogenation occurring.

Numerous attempts were made to fluorinate phenols with cupric fluoride, but these resulted in excessive tar formation and no fluorophenols were identified. Similarly, cupric cyanide failed to produce identifiable cyanophenols.

In addition to phenol, compounds which can be chlorinated or brominated with the cupric halides include any of the cresols, ethylphenols, butylphenols, octylphenols, octadecylphenols and other alkylphenols in which there is a replaceable hydrogen on the benzene ring in at least one of the positions ortho- or para- to the phenolic hydroxyl. No limit has been found to the length of an alkyl group which may be attached to a phenolic compound useful in the reaction. The readily available alkylphenols have from 1 to 18 carbon atoms in the alkyl group.

We claim:

1. The method which consists essentially in heating together a cupric halide from the group consisting of cupric chloride and cupric bromide and a compound from the class consisting of phenol and the alkylphenols having a replaceable hydrogen atom on the benzene ring in at least one of the positions ortho- and para- to the phenolic hydroxyl, in liquid contact, at a temperature between 45° and 300° C. at which the cupric halide is reduced, thereby to effect halogenation of the phenol.

2. The method claimed in claim 1, wherein the reaction is effected in the presence of liquid water.

3. The method claimed in claim 1, wherein the reaction is effected under substantially anhydrous conditions.

4. The method claimed in claim 1, wherein the cupric halide is cupric chloride.

5. The method claimed in claim 1, wherein the cupric halide is cupric bromide.

6. The method claimed in claim 1, wherein the compound subjected to halogenation is phenol.

References Cited in the file of this patent

UNITED STATES PATENTS

| | | |
|---|---|---|
| 2,221,808 | Mills et al. | Nov. 19, 1940 |
| 2,575,167 | Fontana et al. | Nov. 13, 1951 |